United States Patent Office 2,780,631
Patented Feb. 5, 1957

2,780,631

THIAZOLYL CHLORO-ALIPHATIC AMIDES

Kenneth C. Kauer, Midland, Mich., assignor to The Dow Chemical Company, Midland, Mich., a corporation of Delaware No Drawing. Application May 4, 1956,
Serial No. 582,642

6 Claims. (Cl. 260—306.8)

This invention is concerned with thiazolyl chloro-aliphatic amides having the formula

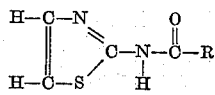

In this and succeeding formulae, R represents a chloro-aliphatic radical containing 1 to 2 carbon atoms, inclusive, and 1 to 3 chlorine atoms, inclusive. The new compounds are crystalline solids somewhat soluble in many organic solvents and of low solubility in water. These compounds have been found useful as antimicrobial agents and particularly as active toxicants for the control of bacteria such as *Staphylococcus aureus* and fungi such as *Rhizopus nigricans*.

The compounds of the invention may be prepared by reacting 2-aminothiazole with an acid chloride of the formula

in the presence of a hydrogen chloride acceptor such as pyridine or quinoline. The reaction is somewhat exothermic and proceeds readily when the reactants are contacted at ordinary temperatures. Good results are obtained when employing substantially equimolar proportions of the 2-aminothiazole and acid chloride reactants and of the hydrogen chloride acceptor. The products may be purified by conventional procedures such as washing with water and recrystallization from organic solvents.

In practice, the reaction is conveniently carried out in the presence of an inert solvent such as benzene, toluene or the like. In carrying out the reaction, the 2-aminothiazole and a hydrogen chloride acceptor such as pyridine are mixed together and the acid chloride reactant added thereto portionwise with stirring. Where an inert solvent is employed, the latter may be mixed with the aminothiazole and hydrogen chloride acceptor or with the acid chloride reactant or a portion of the solvent may be admixed with each of the above. Upon completion of the reaction, the reaction mixture may be washed with water and any reaction solvent removed by evaporation to obtain the desired product as a residue. The latter may be further purified by recrystallization from organic solvents, if desired.

The following examples illustrate the invention, but are not to be construed as limiting the same.

*Example 1.—2-chloro-N-(2-thiazolyl) acetamide*

50 grams (0.5 mole) of 2-aminothiazole was dissolved in a mixture of 200 milliliters of benzene and 50 milliliters of dry pyridine and a solution of 60 grams (0.53 mole) of chloroacetyl chloride in 150 milliliters of benzene added thereto portionwise with stirring at 20°–30° C. Stirring was continued for 15 minutes after completion of the addition to complete the reaction. During the above operations, crude product precipitated from the reaction mixture as a brown solid. The crude reaction mixture was poured into 1500 milliliters of water and the resulting suspension filtered to obtain a crude 2-chloro-N-(2-thiazolyl) acetamide product as a light tan powder. The latter was recrystallized from denatured alcohol to obtain a purified product melting at 159°–160° C. and containing 18.1 percent by weight of sulfur and 20.02 percent by weight of chlorine by analysis as compared to theoretical values of 18.1 and 20.04 percent, respectively.

*Example 2.—2,2-dichloro-N-(2-thiazolyl) propionamide*

50 grams (0.5 mole) of 2-aminothiazole was dissolved in a mixture of 200 milliliters of benzene and 50 milliliters of dry pyridine and a solution of 81 grams (0.5 mole) of 2,2-dichloropropionyl chloride in 150 milliliters of benzene was added thereto portionwise with stirring. The addition was carried out at temperatures of from 20° to 25° C. during a period of 15 minutes and stirring was thereafter continued for an additional 30 minutes. During the above operations, crude product precipitated as a gummy mass. On completion of the reaction, the reaction mixture was poured into 1 liter of water and the resulting slurry filtered to separate the crude solid product. The latter was dried and found to melt at 162°–165° C. This 2,2-dichloro-N-(2-thiazolyl) propionamide was found to contain 31.1 percent by weight of chlorine, 14.4 percent by weight of sulfur and 12.3 percent by weight of nitrogen by analysis as compared to theoretical values of 31.5, 14.2 and 12.4 percent, respectively, calculated for the above composition.

*Example 3.—2,2-dichloro-N-(2-thiazolyl) acetamide*

34 grams (0.34 mole) of 2-aminothiazole was dissolved in a mixture of 300 milliliters of benzene and 50 milliliters of dry pyridine and a solution of 50 grams (0.34 mole) of dichloroacetyl chloride in 100 milliliters of benzene was added thereto portionwise with stirring. The addition was carried out at a temperature of 8°–12° C. during a period of about 15 minutes. Following the addition, stirring was continued for about 15 minutes more and the temperature of the reaction mixture allowed to rise to 15° C. to complete the reaction. During the above operations, crude product precipitated as a gummy mass. On completion of the reaction, the mixture was poured into 200 milliliters of distilled water. The latter dissolved the pyridine hydrochloride by-product and the desired amide product remained as a slurry of yellow crystals. This product was separated by filtration and recrystallized from denatured alcohol to obtain a 2,2-dichloro-N-(2-thiazolyl) acetamide product in the form of yellow flaky crystals melting at 182°–183° C.

*Example 4.—2,2,2-trichloro-N-(2-thiazolyl) acetamide*

30 grams (0.3 mole) of 2-aminothiazole was dissolved in a mixture of 250 milliliters of benzene and 24 milliliters of dry pyridine and a solution of 55 grams (0.3 mole) of trichloroacetyl chloride in 200 milliliters of benzene was added thereto portionwise with stirring. The addition was carried out during a period of 15 minutes while maintaining the reaction mixture at temperatures of from 15° to 21° C. During the above operation, crude product precipitated from the mixture. On completion of the reaction, the reaction vessel and contents were cooled to 10° C. and the crude solid product separated by filtration. The filter cake was washed twice with 300 milliliter portions of water, dried and recrystallized from absolute alcohol to obtain the desired 2,2,2-trichloro-N-(2-thiazolyl) acetamide as a tan powder having a melting point of 198°–200° C.

*Example 5.—2,3,3-trichloro-N-(2-thiazolyl) acrylamide*

40 grams (0.4 mole) of 2-aminothiazole was dissolved in a mixture of 300 milliliters of benzene and 50 milliliters of dry pyridine and a solution of 77.5 grams (0.4 mole) of 2,3,3-trichloroacrylyl chloride in 200 milliliters of benzene was added thereto portionwise with stirring. The addition was carried out at temperatures of from 15° to 25° c. and resulted in precipitation of the crude product. Following the above addition, the reaction mixture was stirred for 20 minutes and then mixed with 500 milliliters of water to produce a slurry of tan crystals. The latter was separated by filtration and the solid product recrystallized from 700 milliliters of absolute alcohol to obtain a 2,3,3-trichloro-N-(2-thiazolyl) acrylamide product as a tan crystalline material having a melting point of 185°–186° C.

2,2-dichloro-N-(2-thiazolyl) acetamide, 2,2,2-trichloro-N-(2-thiazolyl) acetamide, 2-chloro-N-(2-thiazolyl) acetamide and 2,2-dichloro-N-(2-thiazolyl) propionamide were separately suspended in nutrient agar media in an amount sufficient to saturate said media with the compound. The resultant nutrient media were poured into petri dishes, cooled and streaked with an actively growing culture of *Staphylococcus aureus*. Similar petri dishes containing the nutrient media with no additives were similarly inoculated to serve as checks. All the inoculated dishes were then maintained in an incubator at 35° C. for a period of about 72 hours. At such time it was observed that many vigorously growing colonies of *Staphylococcus aureus* were established on the check media whereas growth of the organism was substantially completely suppressed on each of the media containing a N-(2-thiazolyl) amide. Similar determinations with 2,2-dichloro-N-(2-thiazolyl) acetamide, 2-chloro-N-(2-thiazolyl) acetamide, 2,2-dichloro-N-(2-thiazolyl) propionamide and 2,3,3-trichloro-N-(2-thiazolyl) acrylamide in nutrient media inoculated with a suspension of viable spores of *Rhizopus nigricans* gave substantially complete inhibition of growth of the fungal organisms.

I claim:
1. N-(2-thiazolyl) chloro-aliphatic amides having the formula

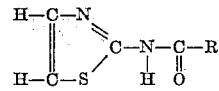

wherein R represents a chloro-aliphatic radical containing 1 to 2 carbon atoms, inclusive, and 1 to 3 chlorine atoms, inclusive.

2. 2-chloro-N-(2-thiazolyl) acetamide.
3. 2,2-dichloro-N-(2-thiazolyl) acetamide.
4. 2,2,2-trichloro-N-(2-thiazolyl) acetamide.
5. 2,2-dichloro-N-(2-thiazolyl) propionamide.
6. 2,3,3-trichloro-N-(2-thiazolyl) acrylamide.

No references cited.